US00RE49998E

(19) United States
(12) Reissued Patent
Mukku et al.

(10) Patent Number: US RE49,998 E
(45) Date of Reissued Patent: Jun. 4, 2024

(54) METADATA UPDATING

(71) Applicant: INNOVATIONS IN MEMORY LLC, Dover, DE (US)

(72) Inventors: Jagadish Kumar Mukku, Sunnyvale, CA (US); Hector Cuellar, San Jose, CA (US)

(73) Assignee: Innovations in Memory LLC, Dover, DE (US)

(21) Appl. No.: 17/478,336

(22) Filed: Sep. 17, 2021

Related U.S. Patent Documents

Reissue of:
(64) Patent No.: 10,417,213
Issued: Sep. 17, 2019
Appl. No.: 15/000,836
Filed: Jan. 19, 2016

U.S. Applications:
(60) Provisional application No. 62/106,997, filed on Jan. 23, 2015.

(51) Int. Cl.
*G06F 16/00* (2019.01)
*G06F 16/18* (2019.01)
*G06F 16/23* (2019.01)

(52) U.S. Cl.
CPC ..... *G06F 16/23* (2019.01); *G06F 16/1805* (2019.01)

(58) Field of Classification Search
CPC ..... G06F 16/23; G06F 16/1805
See application file for complete search history.

(56) References Cited

U.S. PATENT DOCUMENTS 8,104,087 B2 * 1/2012 Quinn ..... G06F 11/1402 717/172
8,484,259 B1 * 7/2013 Makkar ..... G06F 17/30979 707/769
9,244,958 B1 * 1/2016 MacCanti ..... G06F 17/30578
9,335,939 B2 5/2016 Bennett et al.
2008/0005505 A1 * 1/2008 Maegawa ..... H04N 5/76 711/156
2012/0259901 A1 * 10/2012 Lee ..... G06F 16/27 707/827
2012/0284317 A1 * 11/2012 Dalton ..... G06F 16/14 707/827
2013/0013958 A1 * 1/2013 Leggette ..... G06F 16/24 714/E11.054
2013/0036088 A1 * 2/2013 Orenstein ..... G06F 11/1453 707/610

* cited by examiner

*Primary Examiner* — Joshua D Campbell
(74) *Attorney, Agent, or Firm* — Volpe Koenig

(57) ABSTRACT

A storage system and method of operating the storage system is described where the metadata used to access the data stored in a storage device is distributed amongst a plurality of controllers in communication with a user, with each other and with the storage device. Each controller stores at least the metadata needed to access the data relevant to the user at the time, and metadata is updated to respond to internal system activities such as device failures, snapshots, backup operations or the like. To preserve coherence of the metadata, each metadata update is communicated to the other controllers and the storage device. The update is either transmitted to the other controllers and to the storage device and each metadata location is updated, or the update is transmitted to the storage device and each of the controllers is instructed to request an update from the storage device.

17 Claims, 3 Drawing Sheets

METADATA UPDATING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of U.S. provisional application Ser. No. 62/106,997, filed on Jan. 23, 2015, which is incorporated herein by reference.

TECHNICAL FIELD

The subject matter of the present application may be related to data storage systems or networked computing systems.

BACKGROUND

A common architecture for enterprise computing systems includes a client computer and a storage system, where the client system performed most of the computational intensive tasks using applications programs and the information needed for the computation was retrieved from a storage system. Often the storage system was not directly attached to the computer. The connection between the two system components depended on the data storage concept and was often described as a SAN where data was stored as fixed sized blocks and as a NAS where data was stored as files.

A plurality of server computers may access a common data storage sub-system where the multiple server computers may provide load balancing, redundancy or other architectural features. In such a system, a plurality of computers may have local metadata that relates to the shared storage resource or other shared attribute or capability. Changes to the metadata may be initiated, for example, by a user requesting a change to logical unit number (LUN) properties. The request, in whatever form initiated, needs to be translated into a change in the metadata describing the change, at all of the computers, controllers, or the like that are affected by the change. This may need to be done while maintaining the integrity of the metadata.

SUMMARY

A storage system with distributed metadata is described including: a non-volatile storage device having a communications interface with a management sub-system. The management sub-system may have a plurality of controllers in communication with the storage device, with each other, and with a plurality of external users.

The management sub-system may maintain metadata relating to the data stored in the in the storage device describing an allocation of storage device resources to user requirements and each of the controllers of the management sub-system may maintain an copy of the metadata corresponding to at least current active user access requirements. When the metadata changes, due to internal or external activity, the changed metadata is sent by the originating controller to either to each of the controllers and the storage device; or is sent to the storage device and each relevant controller is instructed to read metadata from the storage device to perform an update. The selection between the update processes is based on a policy which may take account of the number of substantially simultaneous updates to be performed, logical locality or other factors relevant to storage system performance.

A method of managing distributed metadata in a storage system having a plurality of controllers in communications with a common storage medium connected to each other and to users by a network or point-to-point links, includes maintaining metadata at each of the controllers sufficient to access data stored in the common storage medium in accordance with a predetermined allocation; updating the metadata at each of the controllers having an overlapping storage allocation and updating the metadata on the common storage medium.

For small updates, the updating is performed by sending the update to each of the controllers having an overlapping storage allocation on the common storage medium and to the metadata on the common storage medium. The updates are stored as the metadata at each location.

For large updates, the updating is performed by sending the update to the common location and directing each of the controllers to retrieve one of: an update file; or, the updated metadata from the common storage medium.

Whether an update is large or small is based on a predetermined policy which may include the size of the update to be performed, the logical locality of the update, the frequency of the update, the latency associated with the update and with any service level agreement (SLA) with the user, or the like.

DESCRIPTION

Figure 1:
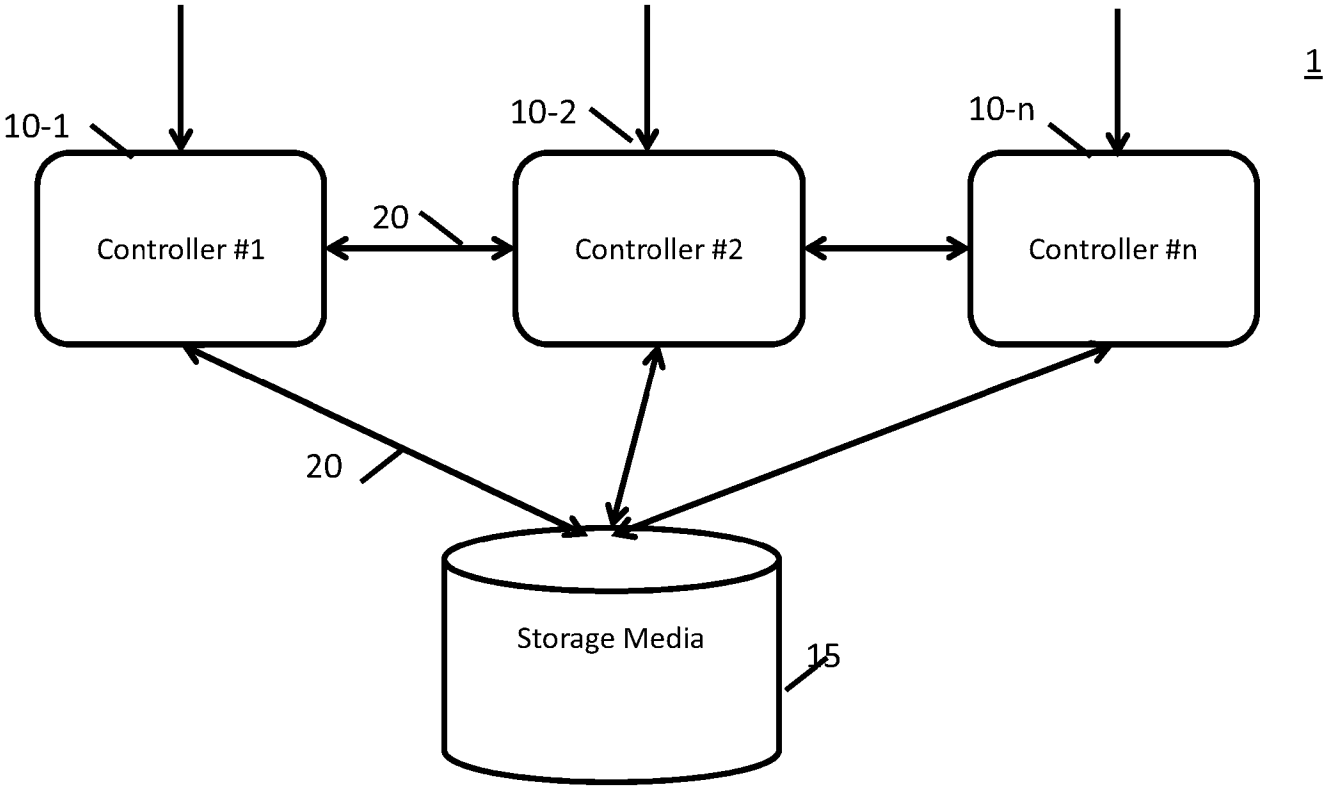
FIG. 1 is a block diagram of a data storage system having multiple controllers accessing the storage media.
Figure 2:
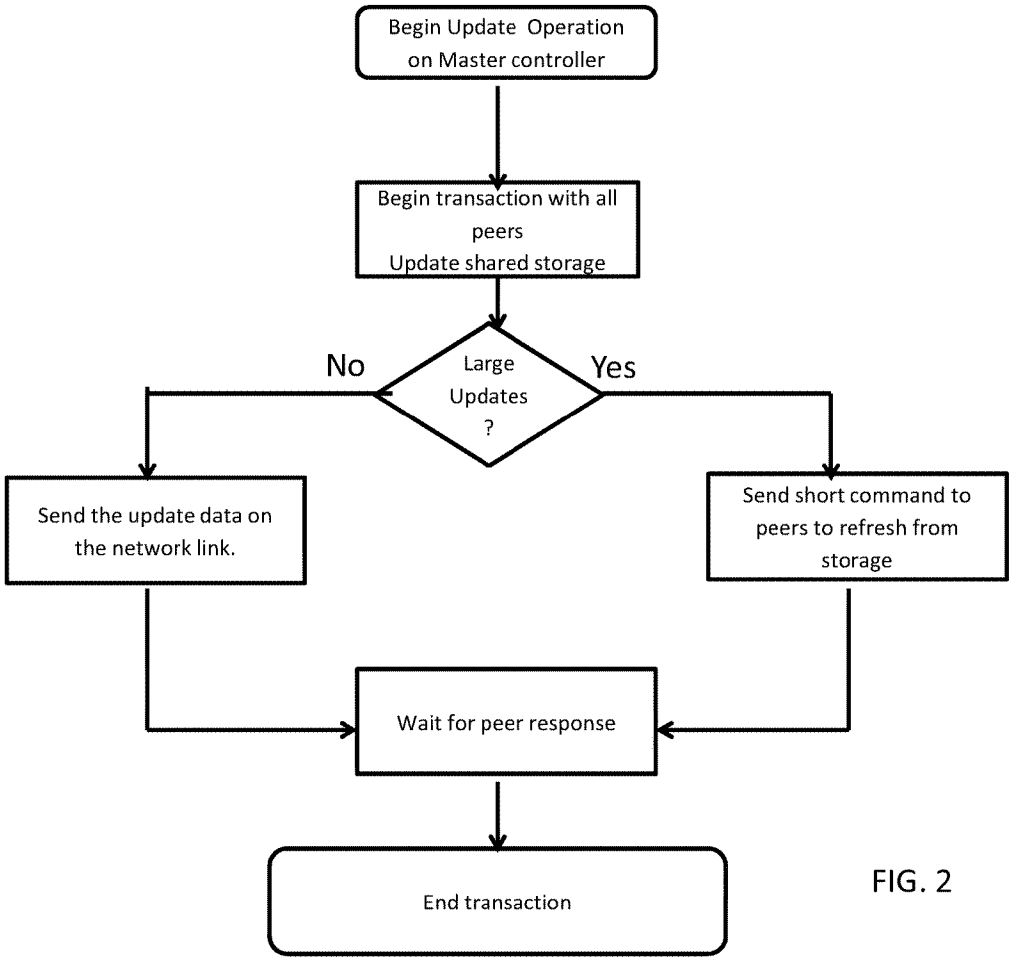
FIG. 2 is a flow chart illustrating the metadata update process dependence on the size of the update.
Figure 3:
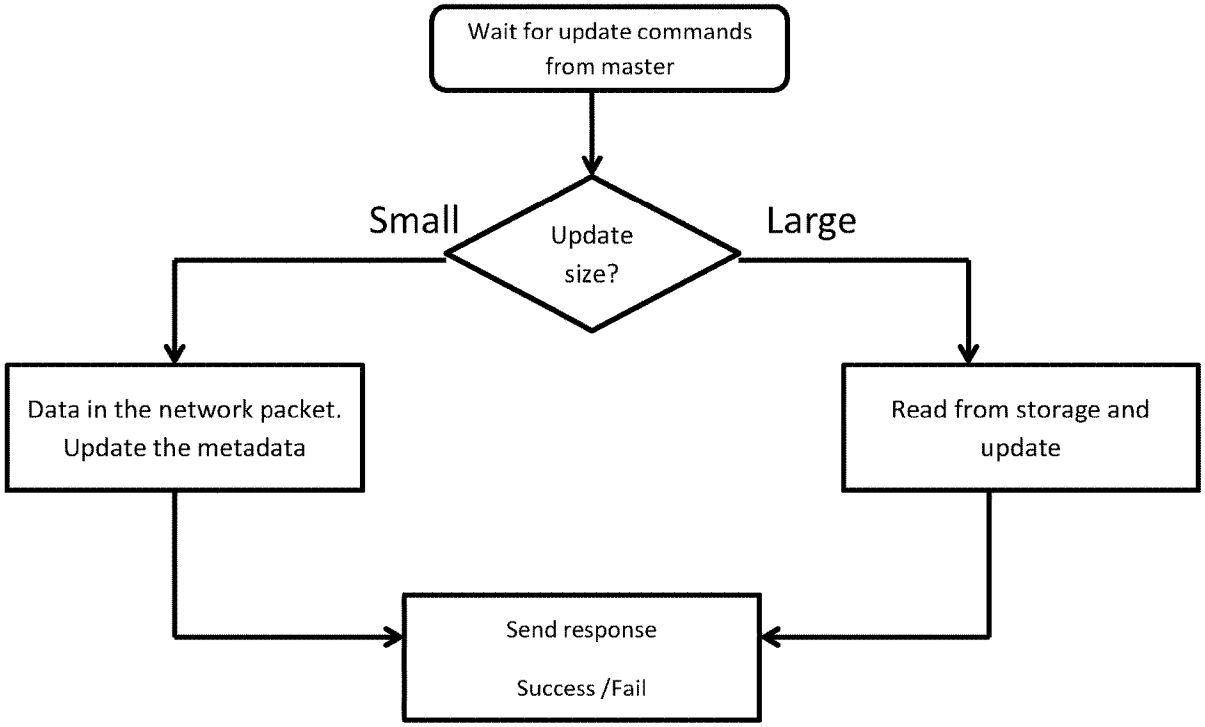
FIG. 3 is a flow chart of the response of a non-master controller to an update command received from a master controller.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP, array processor, or the like, that acts on the instructions to perform functions and actions described herein.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have the capability of configurable logic.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

In addition to allocation of storage areas, which may be virtualized, such attributes as snapshots, deduplication, compression, encryption, replication and backup may be changed as the usage of the system 1 is operated to meet user requirements. Herein, the metadata may include any ancillary data that is used to operate the system 1 that is not user data and includes data describing objects.

In an aspect, a computing system 1 having a plurality of controllers 10 sharing a storage media 15 is shown in FIG. 1. The storage media 15 may be comprised of a solid state storage array, a plurality of disks, which may be either mechanical or solid state disks (SSD), or other non-volatile data storage media. The storage system 15 may be either local, dispersed, or a combination of storage media types and locations. Communications between the controllers 10 and the storage media 15 may be point-to-point links 20, a switched fabric, an Ethernet or any communications protocol having sufficient functionality, bandwidth and latency properties to satisfy the system design.

Each of the controllers may have metadata embodying, for example, the relationship of a user request to the place and means for satisfying the user request. In an example, a read request may specify a LUN and a logical block address (LBA), or a file name and an extent. The metadata to interpret this request is present at each of the controllers 10-1, . . . , 10-n that is a part of the shared resource, and the metadata needs to be consistent across all of the controllers 10, or at least those controllers that have been assigned at any particular time to service requests for a particular user. That is, the response to the user should be the same result without regard to the controller that received the request.

In a high performance system, requesting such metadata from another controller, from common stored metadata, or the like, imposes increased communication burdens on the links between the components and delays associated with retrieval of the metadata, if it is not locally stored. Consequently each controller 10 may have a metadata image that is identical to the metadata image on the remaining controllers 10, and changes to the metadata images are made in a manner that preserves the consistency. Where such consistency is lost during a change, the controller that no longer has consistent metadata would be inhibited from servicing a request to at least the user area (e.g., LUN) which is not consistent with a master metadata image.

In an example, one of the controllers 10-1 of the system 1, shown in FIG. 1, may be designated as a master controller 10 for the purposes of metadata maintenance, although it would be understood by a person of skill in the art that the system 1 may be arranged so that any controller 10 receiving a request that involves a change in the common metadata may be configured to initiate these actions, providing that such actions are communicated to the remainder of the controllers in some manner that preserves consistency. An example of this is a designation of one of the controllers as a temporary master controller when the update may be initiated by that controller, and passing the designation to another controller upon completion of the action.

Consider metadata M1, a same copy of which is stored on each of the relevant controllers 10 and in the storage media 15. The metadata M1 may be actively used by the controllers 10 and any controller associated with the storage media so as to relate a user request to perform a function to the execution of the function by the system 1. Such functions may include time-initiated events, such as backups, snapshots, or the like, or other events initiated within the system 1 itself. A user interface (not shown) may configure an allocated LUN to perform typical enterprise data management and protection actions, such as snapshots, space reclamation, and replication. When performing snapshots, memory space may need to be allocated for the snapshot, and when the programmed maximum number of snapshots is reached, older snapshots may be deleted so that the memory space may be reused. Data may be periodically archived based on user-specified criteria such as frequency of access or age, and the metadata may need to be modified to reflect these actions. Moreover, some LUNs, for example, may be configured to allocate a predetermined maximum space for the storage of snapshot data. When such a limit is reached, the snapshot data may be deleted in accordance with a policy, resulting in a change in associated LUN metadata. Data replication may be performed to identify and transfer data and this action creates and modifies metadata.

Not all of the controllers in a storage system may be configured to be capable of processing all of the requests from all of the users at any particular time. A sufficient quantity of controllers may be allocated so as to satisfy requirements for reliability and service quality, and these requirements may be configurable parameters.

Where a storage system is a shared resource, each user may have a different temporal profile of activity, response-time expectations, data-protection level, and the like. These may be represented in a service-level-agreement (SLA) between the user and the supplier, whether such a supplier is internal to the enterprise, a data services provider, or a cloud storage environment. Controllers of the plurality of controllers may be programmatically or dynamically reallocated to optimally satisfy the composite performance requirements of the storage system 1. This may include assigning additional controllers 10 to service specific workloads, and the metadata at the additional controllers would be updated so as to retrieve the appropriate subset of the metadata M1 stored in the storage media 15. In an aspect, each controller 10 may maintain a configuration table where the location in the storage media 15 for the metadata appropriate for the LUNs being serviced may be found. Alternatively, a complete system allocation table M1 for the metadata locations in the storage media 15 may be maintained in each controller 10, and the LUNs activated or deactivated as required. Whether inactive metadata is stored in each controller 10 or retrieved when activated is a design consideration relating to the sizes of the metadata and the latency in activating a LUN on a controller 10.

As discussed herein, a controller 10 of the plurality of controllers may be designated as a master controller. This is a simple configuration, but is not a limitation. In an aspect, the function of a master controller may be assumed by another controller in the event of the failure of the master controller. This may occur as a part of a management protocol where each of the controllers is sequentially enabled as a master controller and performs an update of the metadata M1 stored in the storage media 15 for the LUNs where it is the responsible controller. Other controllers servicing the LUNs, which may be less than all of the controllers, may be updated if needed and the function of master controller passed along in a round robin. A time-out protocol may enable rapid identification of a failed controller so that a redundant controller may perform the function. In such an instance, another controller would be assigned to serve as the redundant controller until the fault is cleared.

In another aspect, the master controller may poll the other controllers in order to determine if one of the controllers is ready to perform metadata maintenance, and transfer the control to that controller. Such configurations may be used for load balancing, redundancy and the like. However a single controller may be designated as the master controller for all of the controllers, and a second controller may be designated as the redundant master controller.

The controller 10 actively performing the function may use the metadata M1 that is locally stored in the controller (e.g., 10-1) rather than the identical metadata M1 that is stored in another controller (e.g., 10-2 or 10-3) or in the storage media 15. Using the local metadata decreases latency and transactions between devices.

Small changes to the metadata may be made by sending an update to each of the other controllers 10 and to the storage media 15 and awaiting acknowledgement from each of the recipients of the update. When these responses have been received, the update may be considered to be effective.

The number of updates to the metadata M1 that may be initiated in a large data storage system may result in a plurality of individual updates, more than one of which may be in process simultaneously. In addition to the number of outstanding metadata update requests and acknowledgements that may be pending, the sequence of performance of these updates and the effectivity time of the new metadata may be uncertain. This could result in lost or miss-referenced data.

In an aspect, the metadata M1 may be updated by making a copy M2 of the metadata M1 in the storage media 15 and performing the update on copy M2. This is intended to be the new common metadata. After receiving acknowledgement that the new metadata M2 has been prepared, each of the controllers 10 that has local metadata M1 may be notified by the initiating controller to request metadata M2. If metadata M2 was not also formulated at the initiating controller, that controller would retrieve the metadata M2 as well. Once the controllers 10 acknowledge the receipt of the new metadata M2, the process is complete.

As would be appreciated by a person of skill in the art, some procedure needs to be provided so as to prevent the metadata M2 from becoming obsolete at controllers other than the master controller if a change to the metadata is initiated during the update process. In the case where one of the controllers is designated as the master controller, a request for change in the metadata received at another controller is forwarded to the master controller. This metadata change request may be performed at the master controller and the change coordinated with the other controllers. In addition, the changes may be logged or otherwise stored at the master controller for the purposes of making an update to the metadata stored in the storage media 15.

It may be desirable to coordinate the changes in the metadata at the plurality of controllers such that the changes are effective at a particular epoch. In an example, described in U.S. application Ser. No. 13/546,346, filed on Jul. 11, 2012, which is commonly owned and is incorporated herein by reference, a plurality of controllers is coordinated such that each operation is assigned a unique global sequence number (although a common global sequence number may be assigned where the operations are atomic, such as may be the situation where the data is dispersed in a RAIDed configuration). Changes to the metadata occurring since the last update may be stored in a log. When a request for metadata is received, the log is processed from the global sequence number associated with the last event, prior to accessing the existing metadata M1. Thus, any later change will be encountered before the main metadata is accessed, The command to activate any change to the metadata may include the global sequence number for which the change has become effective and only global sequence numbers from the log that are equal to or greater than that number will be processed.

Where a controller 10 has lost synchronization with the metadata stored in the storage media 15, a metadata update may be initiated, where the stored metadata M1 is retrieved from the storage media 15. During the time that the stored metadata is being retrieved, the specific controller 10 may be inhibited from servicing the request. The request may be forwarded to an operable controller during this period of time.

In another aspect, when each of the controllers 10 has performed the required update a status response message is sent to the master controller 10. The master controller may be configured to wait a period of time for such messages to be received, as the message signifies that the metadata was successfully loaded from the storage media 15 and that any local processing has been completed. The cause of such a failure could be an inoperative controller, so merely reinitiating the process would not overcome the fault. One option is to periodically send a message to the faulty controller instructing the performance of the update and repeating the command after each time out. Since no data is being transmitted from the storage media 15 to the failed controller, there is little degradation of the throughput of the intra system communications capability. After some time, a new metadata M2 will be needed at the storage media 15, and the periodic message instructing the performance of an update is terminated and a new general update sequence is initiated.

While this discussion uses the term metadata broadly, as previously described, the metadata may be partitioned such that only the metadata needed by specific controllers in order to service the assigned workload need be refreshed in each specific controller.

Metadata M2 may have a large size in a storage media 15 and even when consolidating the update into a single data transfer (which may be packetized or the like in accordance with the communications protocol), the amount of unchanged data may be a significant portion of the data of M2. In an alternative, the changes to the metadata M1 may be stored as a log file in the storage media 15 and the change log may be processed to reflect the latest changes and the change log be sent to each of the controllers during the update. In this example, the new metadata M2 is reconstructed at each controller by applying the change log to the existing metadata M1. In doing this, the changed metadata may be stored as metadata M2 until the updating has been completed and then the metadata M2 be obsoleted.

The metadata M2 may be checkpointed to non-volatile storage in each controller so as to reduce the time to recover from a fault by obviating the need to reinitialize the metadata at each controller.

In another example, a request to perform a function that results in a change in metadata is received at a controller 10. If the controller 10 is the master controller of a group of controllers 10, and the metadata change is determined to be minor, the change is placed in a log file at the master controller 10. (Minor should be contrasted with major, where the criteria may be selected by the designer or manager of the storage system 1 giving consideration to the time to perform the update, the amount of metadata that is to be changed, or the like. That is, it has a definite value rather than being qualitative, but the value is specifiable either by the design or by configurations of the system.).

The master controller assigns a tag value to the change, where the tag value is a monotonically increasing number, such as a global sequence number. A single tag value is used across the entire storage system 15. The change, including the tag value is sent to the other controllers 10 of the storage system 1 and to the storage media 15, and is stored in a log file at each place. Once a log file is established at each place, any request for metadata is serviced at a controller servicing the request by first processing the log file to determine if the requested metadata has been recently changed and then processing the metadata to find data that has not been changed if it has not been previously found in the log file. A synchronization command is sent to each of the places where the log file is stored, so as to cause the log file to be processed, starting from the beginning of the log file until a tag value is reached. The contents of the log file are used to update the local metadata. During this short period of time, access to the local metadata may be inhibited.

Once the local metadata has been updated, the local controller may resume processing user requests for metadata, including searching the log if it was not completely processed during the update. So, the metadata of each of the places where it has been stored is updated while maintaining coherency.

Where the major update is being performed, the metadata of M2 may be read from the storage media 15 to the individual controllers 10. The metadata M2 may be characterized as being current as of a sequential tag value, which may be a system time, when the tag value was created. Changes to the metadata that were made through the change log may also have been made to the M2 metadata up until the time the major change is initiated. A change to the metadata after the major update has been initiated may be stored in the change logs at each of the places where the metadata has been stored. Once the metadata M2 is present at each of the places, the local change log may be processed from the beginning to a tag values specified in the update command. The remainder of the log, if any, may be retained and scanned prior to each search of main metadata. The length of this log need not be any larger than that which may be needed to buffer changes while the rest of the log is processed.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A data storage system, comprising:

a storage media comprising a non-volatile storage device having a communications interface with a management sub-system; and the management sub-system comprising a plurality of controllers in communication with the storage media, wherein the plurality of controllers are in communications with the storage device and with an external user, wherein the management sub-system maintains metadata in the storage media, the metadata containing relationships between logical block addresses (LBAs) and the location of the LBAs in the storage media and each of the controllers maintains an image of the metadata identical to the metadata images on the other controllers, the metadata image corresponding to at least current active user access requirements, a controller of the plurality of controllers is assigned as a master controller, the master controller sends changed metadata either to each of the controllers or to the storage device, the master controller instructs each relevant controller to read metadata from the storage device to perform an update, the master controller adds the update to a log file and sends the log file to each of the other controllers and directs each of the controllers having overlapping storage allocation to update the metadata at each location with the log file when the update to the metadata is less than a specific value, and the master controller sends the update to the storage media to update the metadata and directs each of the controllers to retrieve the updated metadata from the storage media when the update to the metadata is more than the specified value.

2. The system of claim 1, wherein the changed metadata sent to the storage device modifies an image of the metadata by storing the metadata changes in the log file and a local controller is configured to modify the metadata image using the log file.

3. The system of claim 2, wherein metadata in the log file is processed to update the image of the metadata and a pointer in the log file establishes a common update point for all of the controllers reading the data.

4. The system of claim 1, wherein a round-robin token is used to designate a controller as the master controller.

5. The system of claim 1, wherein the master controller polls each of the other controllers of the plurality of controllers and transfers the designation of master controller to the controller of the plurality of controllers that has a pending metadata update to perform.

6. A method of managing distributed metadata in a storage system, comprising:

providing a plurality of controllers in communication with a common storage medium;

connecting the controllers and the storage medium using a network;

maintaining metadata at each of the controllers containing relationships between logical block addresses (LBAs) or names of files in user requests and the location of the LBAs or files in the common storage medium;

assigning one of the controllers as a master controller;

updating the metadata at each of the controllers having an overlapping storage allocation, and updating the metadata on the common storage medium;

wherein the step of updating includes the master controller:

if the update is less than a specified value, sending a log file including the update to each of the controllers having the overlapping storage allocation and to the metadata on the common storage medium and storing the updates in a file at each location; and if the update is more than the specified value, sending the update to the common storage location to update the metadata and directing each of the other controllers to retrieve one of:

the log file; or, the updated metadata from the common storage medium.

7. The method of claim 6, wherein for metadata update initiated by the master controller of the plurality of controllers includes:

assigning a unique identifying tag value; and evaluating the tag value to order the updates in time order.

8. The method of claim 7, wherein using the log file to update the metadata includes:

determining a tag value such that each log file used to update metadata at each controller and the common storage medium is processed beginning at a time determined by the identifying tag value.

9. A computer program product stored on a non-transient computer readable medium, comprising:

instructions for configuring a plurality of controllers and a storage medium controller in mutual communication with each other and a user to perform the steps of:

maintaining metadata at each controller containing relationships between logical block addresses (LBAs) or names of files in user requests and locations of the LBAs or files on the storage medium;

maintaining metadata at the storage medium containing the relationships between the logical block addresses (LBAs) or names of files in user requests and the locations of the LBAs or files on the storage medium, wherein the metadata is accessible by the plurality of controllers;

updating the metadata with a master controller of the plurality of controllers and updating the metadata with the other controllers and the storage medium controller by one of:

the master controller sending the metadata update in a log file to each of the other controllers and the storage medium controller if the update is below a specified value; and the master controller sending the metadata update to the storage medium controller and instructing the plurality of controllers to retrieve one of an update the log file or the metadata stored in the storage medium controller if the update is above the specified value.

*10. A data storage system, comprising:*

*a storage media comprising a non-volatile storage device having a communications interface with a management sub-system; and*

*the management sub-system comprising a plurality of controllers in communication with the storage media, wherein the plurality of controllers are in communications with the storage device and with an external user, wherein:*

*the management sub-system is configured to maintain metadata in the storage media, the metadata containing relationships between logical block addresses (LBAs) and the location of the LBAs in the storage media and each of the controllers is configured to maintain an image of the metadata identical to the metadata images on the other controllers, the metadata image corresponding to at least current active user access requirements,*

*a controller of the plurality of controllers is assigned as a master controller,*

*the master controller is configured to send changed metadata either to each of the controllers or to the storage device,*

*the master controller is configured to instruct each relevant controller to read metadata from the storage device to perform an update,*

*the master controller is configured to add the update to a log file and send the log file to each of the other controllers and direct each of the controllers having overlapping storage allocation to update the metadata at each location with the log file if the update to the metadata is in a first logical locality, and*

*the master controller is configured to send the update to the storage media to update the metadata and direct each of the controllers to retrieve the updated metadata from the storage media if the update to the metadata is in a second logical locality.*

*11. The system of claim 10, wherein the changed metadata sent to the storage device modifies an image of the metadata*

*by storing the metadata changes in the log file and a local controller is configured to modify the metadata image using the log file.*

*12. The system of claim 11, wherein metadata in the log file is processed to update the image of the metadata and a pointer in the log file establishes a common update point for all of the controllers reading the data.*

*13. The system of claim 10, wherein a round-robin token is used to designate a controller as the master controller.*

*14. The system of claim 10, wherein the master controller is configured to poll each of the other controllers of the plurality of controllers and transfer the designation of master controller to the controller of the plurality of controllers that has a pending metadata update to perform.*

*15. A method of managing distributed metadata in a storage system, comprising:*

*providing a plurality of controllers in communication with a common storage medium;*

*connecting the controllers and the storage medium using a network;*

*maintaining metadata at each of the controllers containing relationships between logical block addresses (LBAs) or names of files in user requests and the location of the LBAs or files in the common storage medium;*

*assigning one of the controllers as a master controller;*

*updating the metadata at each of the controllers having an overlapping storage allocation, and*

*updating the metadata on the common storage medium;*

*wherein the step of updating comprises the master controller:*

*if the update is in a first logical locality, sending a log file including the update to each of the controllers having the overlapping storage allocation and to the metadata on the common storage medium and storing the updates in a file at each location; and*

*if the update is in a second logical locality, sending the update to the common storage location to update the metadata and directing each of the other controllers to retrieve one of: the log file; or, the updated metadata from the common storage medium.*

*16. The method of claim 15, wherein for metadata update initiated by the master controller of the plurality of controllers comprises:*

*assigning a unique identifying tag value; and*

*evaluating the tag value to order the updates in time order.*

*17. The method of claim 16, wherein using the log file to update the metadata comprises:*

*determining a tag value such that each log file used to update metadata at each controller and the common storage medium is processed beginning at a time determined by the identifying tag value.*

* * * * *